United States Patent [19]

Evans

[11] 4,428,836
[45] Jan. 31, 1984

[54] HYDRAULIC DISCHARGE SYSTEM

[75] Inventor: Frank Evans, Sale, England

[73] Assignee: British Nuclear Fuels Limited, Warrington, England

[21] Appl. No.: 399,226

[22] Filed: Jul. 19, 1982

[30] Foreign Application Priority Data

Aug. 13, 1981 [GB] United Kingdom ............... 8124803

[51] Int. Cl.³ ........................................... B01D 23/16
[52] U.S. Cl. .................................. 210/189; 210/268
[58] Field of Search .............. 210/675, 792, 189, 268, 210/293, 269

[56] References Cited

U.S. PATENT DOCUMENTS 3,575,294 4/1971 Hirowatari et al. ............... 210/189

Primary Examiner—Ivars C. Cintins
Attorney, Agent, or Firm—William R. Hinds

[57] ABSTRACT

An hydraulic system for the discharge of a bed of granular material supported on a screen (3), for example a sand filter, comprises an upright cylindrical vessel (1) with a horizontal plate (2) at the lower end of the vessel to support the bed of granular material. The support plate carries screens (3) to allow the passage of water and to block the passage of bed material. The vessel is provided with entry and discharge ports (8 and 10) and a ring of fluidizing jets (13) is located a short distance above the support plate (2). A discharge pipe (11) rises through the bed. The bed of material can be discharged hydraulically from the vessel through the discharge pipe (11) without any mechanical items requiring maintenance within the vessel (1).

4 Claims, 4 Drawing Figures

HYDRAULIC DISCHARGE SYSTEM

BACKGROUND OF THE INVENTION

The present invention concerns an hydraulic system for the discharge of material from a process vessel.

SUMMARY OF THE INVENTION

According to the present invention there is provided an hydraulic system for the discharge of material from a process vessel in which a bed of granular material is supported on a fluid permeable screen within the vessel, the system comprising first and second fluid flow ducts communicating with the interior of the vessel at opposite side of the screen, discharge conduit extending from adjacent the surface of the screen supporting the bed of material to the exterior of the vessel and fluid jet means disposed adjacent the screen to direct jets of fluid on to the bed of material whereby in operation, first, a fluid is introduced into the vessel through at least one of the flow ducts to effect discharge of a major portion of the bed through the discharge conduit and, second, jets of fluid from the jet means effect discharge of the remaining portion of the bed through the discharge conduit.

The system is capable of discharging granular materials having a range of specific gravities. For lighter materials, for example, materials having specific gravities greater than 1.0 and up to about 1.3, fluid can be introduced into the vessel through both the first and second flow ducts during the first stage of the discharge operation. For heavier materials, fluid can be introduced into the vessel through the flow duct situated at the side of the screen remote from the bed and the other duct can be coupled to the discharge conduit during the first stage of the discharge operation. Alternatively, a further duct can be coupled to the discharge conduit during the first stage of discharge of heavier materials with the said other duct closed to flow.

DESCRIPTION OF THE DRAWINGS

The invention will be described further, by way of example, with reference to the accompanying drawings; in which.

DESCRIPTION OF THE PREFERRED EMBODIMENT

Figure 1:
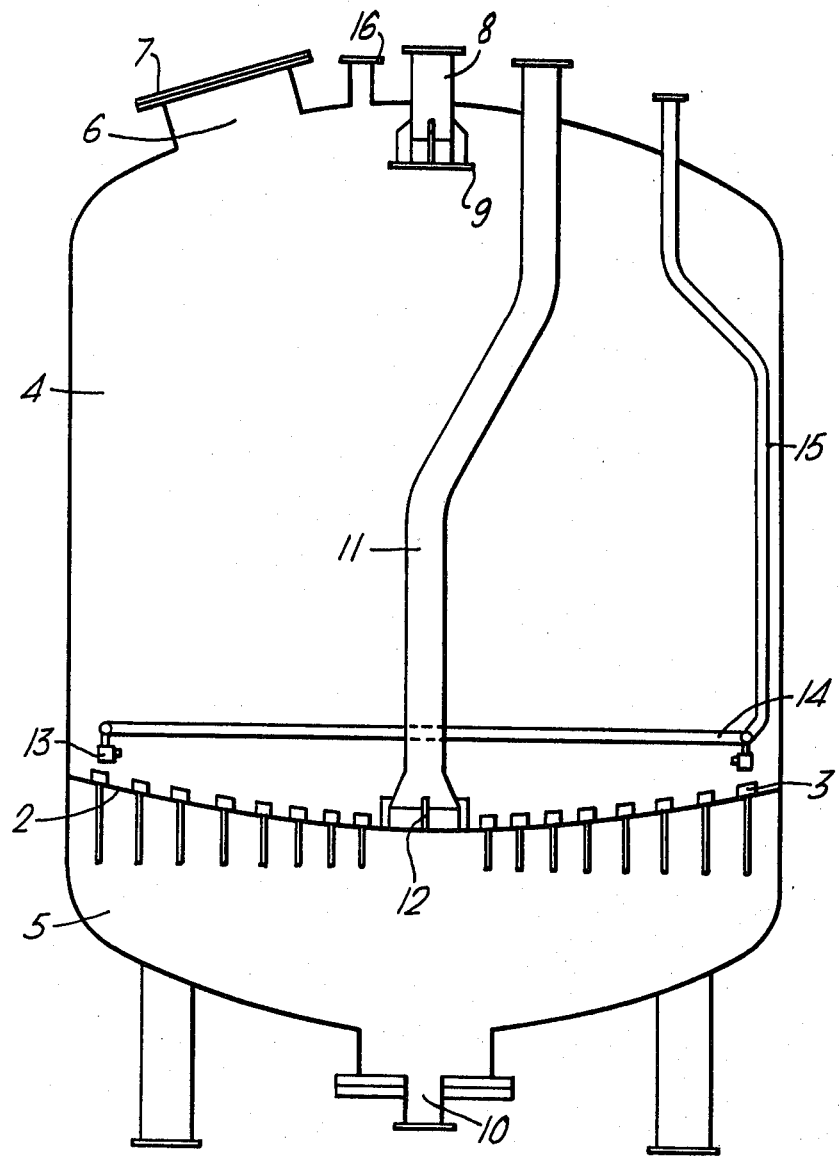
FIG. 1 is a diagrammatic representation of a process vessel incorporating an hydraulic discharge system according to the invention.

In FIG. 1, a process vessel, typically an ion exchange vessel or a sand filter, comprises an upright cylindrical tank 1 containing a plate 2 at the lower end thereof to support a bed of granular material (the bed is not shown in the drawing). The support plate 2 carries screens 3 which permit the passage of fluid (gas and liquid) but which do not allow material deposited as a bed on the plate 2 to drop through the plate. The plate 2 divides the interior of the vessel into a large upper compartment 4 and a small lower compartment 5. Conveniently, and as shown, the support plate 2 is dished.

Bed material such as sand is introduced into the upper compartment 4 through an opening 6 closed by a removable cover 7 in the roof of the vessel 1. A duct 8, serving as an inlet for a liquid to be treated and as an outlet for a backwash liquid, is located in the centre of the roof. The end of the duct 8 within the upper compartment 4 carries a plate 9 which distributes in-flowing liquid about the interior of the compartment. The liquid percolates through the bed on the support plate 2 and treated liquid flows through the screens 3 into the lower compartment 5 to emerge at a duct 10. For backwashing the liquid flow through the vessel is in the reverse direction, water being introduced at the duct 10 to flow upwardly through the screens and the bed into the upper compartment from which it discharges through the duct 8.

A discharge conduit 11 extends from adjacent the support plate 2 to the exterior of the vessel. The end of the conduit 11 within the vessel is flared and is positioned at the centre of the support plate, the open flared end of the conduit being spaced from and supported on the plate by legs 12. Alternatively, instead of passing upwardly through the compartment 4 to emerge through the roof of the vessel the discharge conduit can lead from the centre of the support plate to pass downwards through the support plate into the compartment 5 and emerge through the floor of the vessel.

Fluidising jets 13 are positioned within the compartment 4 at a short distance above the support plate. The jets 13 are connected to a header ring 14 which is supplied by a feed conduit 15. The jets 13 are spaced apart at substantially equal intervals on the ring 14 and are disposed to direct liquid on to the bed carried on the support plate.

A further duct 16 can be provided in the roof of the vessel, this further duct 16 communicating with the discharge conduit 11 outside the vessel. Alternatively, the further duct 16 can be omitted and the duct 8 connected to the discharge conduit 11 outside the vessel, selectively operable valve means being provided between the duct 8 and the discharge conduit 11.

Figure 2A:
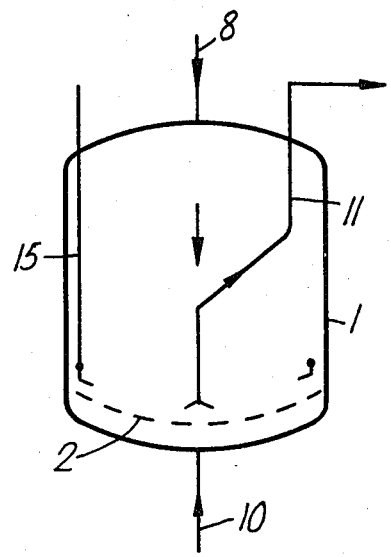
FIGS. 2a, 2b and 2c respectively are schematic diagrams of different stages in the operation of the system.
Figure 2B:
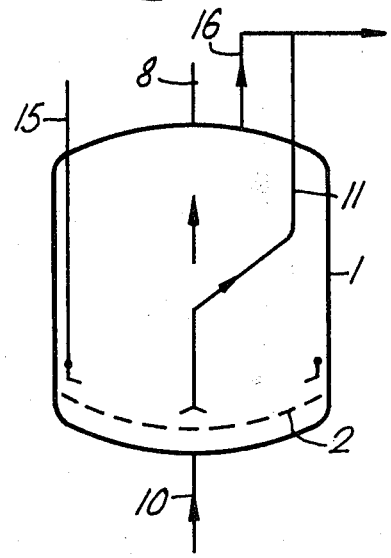
Figure 2C:
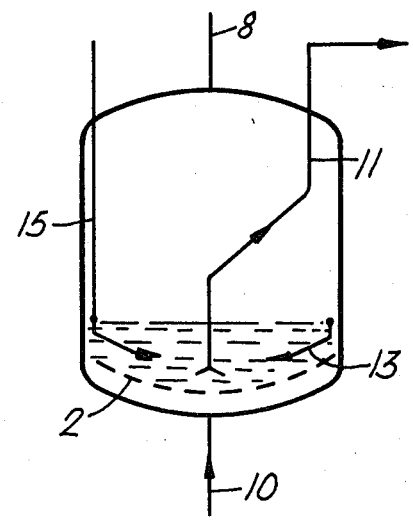

In operation, and with reference to FIGS. 2a, 2b and 2c, assume that the vessel is being used as a filter and the plate 2 supports a bed of sand. A liquid to be treated flows into the upper compartment through the duct 8, passes through the bed and treated liquid emerges at the duct 10. During use it may be necessary to periodically clean the bed and this can be achieved by backwashing. In backwashing a liquid, usually water, flows upwardly through the vessel from the duct 10 to the duct 8.

To discharge the bed from the vessel, the bed is first backwashed with liquid, generally water either alone or in conjunction with an air sparge. This initial backwashing serves to loosen the material of the bed. Discharge then proceeds in two stages, the first stage being operable in two alternative modes. The first mode shown in FIG. 2a is suitable for use with lighter materials whereas the second mode shown in FIG. 2b is suitable for materials having higher specific gravities.

In the mode of FIG. 2a, water is introduced into the vessel through the duct 8 in the roof and through the duct 10 in the floor. The downward and upward flows within the vessel effect or exert a squeeze-like action on the bed material and entrain the material through the discharge conduit 11.

In the alternative mode of FIG. 2b, the duct 8 is closed to inflowing liquid and the duct 10 is the only inlet into the vessel. Water flows from the inlet duct 10 through the support plate to fluidise the bed and a part of the water having entrained bed material passes out of the vessel through the discharge conduit 11. The remainder leaves the vessel through the duct 8 or the vessel can be provided with the further duct 16, the duct 8 or duct 16 being selectively connected to the discharge conduit outside the vessel. The entrained solids concentration is thereby diluted and this reduces friction loss in the final part of the discharge conduit 11. During the first stage a substantial proportion of the bed material, possibly as high as 95% by volume, can be discharged from the vessel by the mode of either FIG. 2a or FIG. 2b. The remaining material is discharged in stage 2 depicted in FIG. 2c. In FIG. 2c, the water level in the vessel is allowed to fall with air or an inert gas replacing the water in the upper compartment 4 of the vessel. Final discharge is effected by means of the fluidising jets 13 supplemented, if required, by a backwash flow through the duct 10. The discharge leaves the vessel through the conduit 11. As the amount of material in the flow is small it is not necessary to provide a dilution flow as in the case of stage one, mode 2 described above.

By way of example only the screens 3 in the support plate 2 can be wire-mesh filters having tail pipes and arranged in concentric rings. Preferably the fluidising jets 13 are plain nozzle jets which are arranged as near as possible to the wall of the vessel and at a height of between 100 and 200 mm above the support plate 2. The jets are directed inwardly and can be between 25° and 45° to the radius of the vessel 1 and between horizontal and 15° downwards. The setting of the jets for maximum efficiency of transfer of the material will be governed by the specific gravity of the material. For a vessel to receive a range of different materials the optimum setting of the jets is considered to be about 3° to the radius and directed horizontally.

In the stage 2 operation with air or inert gas within the upper compartment of the vessel the water level can be at a height of approximately 300 mm above the centre of the suport plate 2. The air or gas within the compartment can be pressurised.

The system is capable of achieving a high efficiency of discharge from the vessel without the use of any moving parts within the vessel which could require periodic maintenance and renewal. As such the system is eminently suitable for use with radioactive processes.

I claim:

1. An hydraulic system for the discharge of material from a process vessel in which a bed of granular material is supported on the upper surface of a screen within the vessel during normal process operation, comprising first and second fluid flow ducts communicating with the interior of the vessel at opposite sides of the screen for passing liquid through the bed during normal process operation, a granular material discharge conduit extending from an inlet end adjacent and above the upper surface of the screen supporting the bed of material to the exterior of the vessel, with an open gap between the inlet end of the discharge conduit and the upper surface of the screen, and fluid jet means disposed adjacent the screen to selectively direct jets of fluid on to the bed of the material independently of liquid flow though said ducts, whereby in operation, first, a fluid is introduced into the vessel through at least one of the flow ducts independently of the jet means to effect discharge of a major portion of the bed through the discharge conduit and, second, jets of fluid from the jet means effect discharge of the remaining portion of the bed through the discharge conduit.

2. An hydraulic system as claimed in claim 1 including means for introducing fluid simultaneously through both the first and second ducts to discharge through the discharge conduit.

3. An hydraulic system as claimed in claim 1 including means for introducing fluid into the vessel through the flow duct at the side of the screen remote from the bed and means for coupling the other duct to the discharge conduit during the first stage of the discharge operation.

4. An hydraulic system as claimed in claim 3 including a further duct coupled to the discharge conduit from the interior of the vessel.

* * * * *